(12) United States Patent
Henriksson

(10) Patent No.: US 7,225,910 B2
(45) Date of Patent: Jun. 5, 2007

(54) FREE-WHEELING HUB DEVICE

(76) Inventor: Bengt-Ake Henriksson, Skolvagen 4, S-376 35 Svangsta (SE)

( * ) Notice: Subject to any disclaimer, the term of this patent is extended or adjusted under 35 U.S.C. 154(b) by 170 days.

(21) Appl. No.: 10/528,141

(22) PCT Filed: Sep. 17, 2003

(86) PCT No.: PCT/SE03/01454

§ 371 (c)(1),
(2), (4) Date: Mar. 17, 2005

(87) PCT Pub. No.: WO2004/027279

PCT Pub. Date: Apr. 1, 2004

(65) Prior Publication Data

US 2006/0011439 A1 Jan. 19, 2006

(30) Foreign Application Priority Data

Sep. 19, 2002 (SE) .................................... 0202774

(51) Int. Cl.
*F16D 41/067* (2006.01)
*A61G 5/02* (2006.01)
(52) U.S. Cl. .................. 192/223.2; 192/19; 280/250.1
(58) Field of Classification Search ............... 188/82.2, 188/82.3, 82.34, 82.4, 82.84
See application file for complete search history.

(56) References Cited

U.S. PATENT DOCUMENTS

| | | | | | |
|---|---|---|---|---|---|
| 2,973,838 | A | * | 3/1961 | Oswold | .................. 188/82.2 |
| 3,750,593 | A | * | 8/1973 | Zetterlund | .............. 104/172.2 |
| 4,045,047 | A | * | 8/1977 | Buckley | .................. 280/250.1 |
| 4,566,353 | A | * | 1/1986 | Stiff | ........................... 475/15 |
| 4,762,332 | A | * | 8/1988 | Seol | ........................ 280/250.1 |
| 6,148,977 | A | | 11/2000 | Bachnak | |
| 6,428,028 | B1 | * | 8/2002 | Folino et al. | .............. 280/249 |
| 6,508,347 | B1 | * | 1/2003 | Hochmuth | .................. 192/44 |

FOREIGN PATENT DOCUMENTS

EP 1199490 4/2002

\* cited by examiner

*Primary Examiner*—Rodney H. Bonck
(74) *Attorney, Agent, or Firm*—Young & Thompson

(57) ABSTRACT

A freewheel hub device includes two locking rings with axial grooves formed in the locking rings and being essentially V shaped in cross-section. The groove walls of one locking ring form a first and a second wedge surface, and one groove wall of the other locking ring forms a third wedge surface. A roll holder with rolls, which extend into the grooves of the locking rings, is mounted in the locking rings. A hub is rotationally arranged in the roll holder (14) and has a circumferential surface for cooperation with the rolls. The locking rings and the roll holder are turnable relative to each other in a limited manner and can take three different setting positions relative to each other.

8 Claims, 6 Drawing Sheets

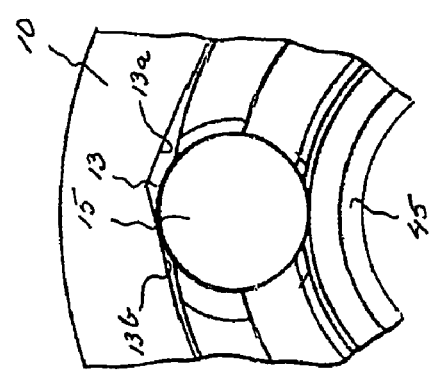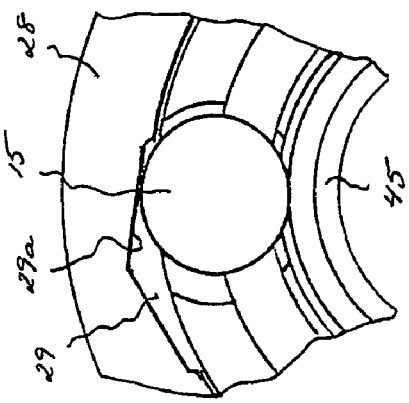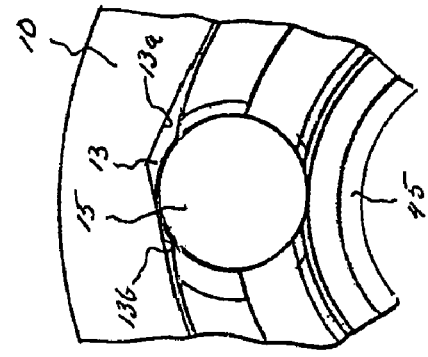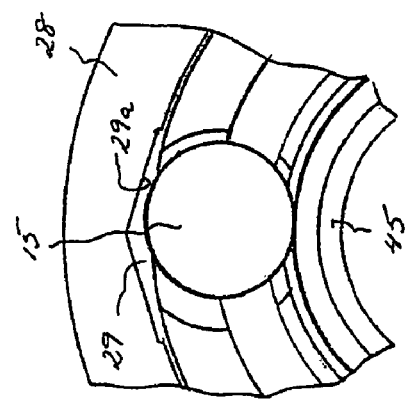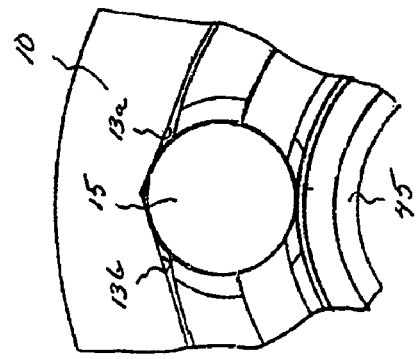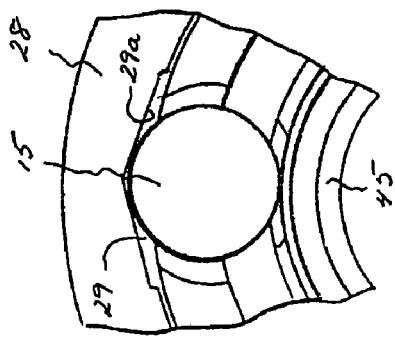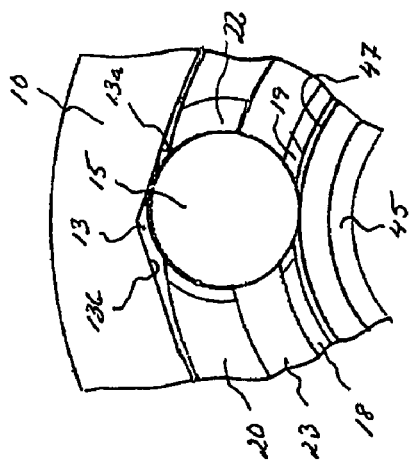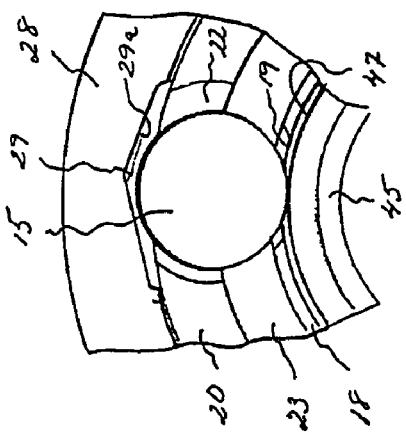
Fig. 6  Fig. 7  Fig. 8  Fig. 9

FREE-WHEELING HUB DEVICE

FIELD OF THE INVENTION

The present invention relates to a freewheel hub device, comprising a mounting part;

a first locking ring means, which is supported by and non-turnably connected to the mounting part and has a centre bore and axial inner grooves, whose one side wall forms a first wedge surface which has a distance, decreasing in one circumferential direction of the first locking ring means, to the axis of the centre bore;

a lock body holder, which is mounted, in a limited turnable manner, in the centre bore of the first locking ring means and supports at least two lock bodies which project radially a distance from the lock body holder and each extend into a separate groove of the first locking ring means and which are movable radially inwards against spring action directed essentially radially outwards; and a hub, which is rotationally mounted in the lock body holder coaxially therewith and has a circular-cylindrical circumferential surface for cooperation with the lock bodies, each lock body, after turning of the lock body holder in said one direction to a first turning position, abutting against the associated first wedge surface, which against said spring action forces the lock body radially inwards in the lock body holder into engagement with the circumferential surface of the hub, whereby the hub is prevented from rotating in said one direction.

BACKGROUND ART

Freewheel hub devices of this type are known in various embodiments, all of which function in such a manner that the hub, when the lock body holder is in its first turning position, is prevented from rotating in one direction but can rotate in the other direction.

SUMMARY OF THE INVENTION

The object of the present invention is to provide a freewheel hub device which is adjustable so that it can optionally prevent the hub from rotating in one direction, allow the hub to rotate in both directions, prevent the hub from rotating in the other direction and also prevent the hub from rotating at all. A special object is to provide a freewheel hub device which is designed so as to be well suited to be mounted on a wheelchair to allow, in four optional setting positions, the wheelchair to be driven forwards but not backwards, to be driven forwards as well as backwards, to be driven backwards but not forwards and not to be driven forwards or backwards. Easy setting of these different modes of functioning would facilitate the operation of the wheelchair significantly.

According to the present invention, this object is achieved by a freewheel hub device which is of the type stated by way of introduction and characterised in that the other side wall of the axial grooves formed in the first locking ring means forms a second wedge surface, which has a distance, decreasing in the other circumferential direction of the first locking ring means, to the axis of the centre bore, each lock body, after turning of the lock body holder in said other direction to a second turning position, abutting against the associated second wedge surface, which against said spring action forces the lock body radially inwards in the lock body holder into engagement with the circumferential surface of the hub, whereby the hub is prevented from rotating in said other direction, while each lock body, when the lock body holder is in an intermediate turning position between the first and the second turning position, is held, by said spring action, disengaged from the circumferential surface of the hub, so that the hub is rotatable in both directions, that the device further comprises a second locking ring means which is concentric with the first locking ring means and has a centre bore and axial inner grooves, whose one side wall forms a third wedge surface which has a distance to said axis, which decreases in said one direction, the lock body holder being mounted in a limited turnable manner in the centre bore of the second locking ring means in such a manner that its lock bodies each extend into a separate groove of the second locking ring means, each lock body, when the lock body holder and the second locking ring means are in a first mutual turning position after turning of the second locking ring means in said other direction relative to the lock body holder, abutting against the associated third wedge surface, which against said spring action forces the lock body radially inwards in the lock body holder into engagement with the circumferential surface of the hub, whereby the hub is prevented from rotating in said one direction.

In a preferred embodiment, a first spring is arranged to bias the lock body holder in said one direction in such a manner that it takes its first turning position, in which each lock body abuts against the associated first wedge surface.

In another preferred embodiment, the lock body holder and the second locking ring means are biased relative to one another by means of a second spring in such a manner that they take a second mutual turning position, from which the second locking ring means is, against the action of the second spring, turnable in said other direction relative to the lock body holder to said first mutual turning position.

The freewheel hub device advantageously has an actuating ring, which is concentric with the locking ring means and the lock body holder and is non-turnably connected to the second locking ring means and connected to the lock body holder in a limited turnable manner, wherein, when the device is in a starting position, in which the lock body holder is held by the first spring in its first turning position and the lock body holder and the second locking means are held by the second spring in their second mutual turning position and the hub thus is rotatable in said other direction but is prevented from rotating in said one direction, the lock body holder, by turning of the actuating ring in said other direction, is turnable to its intermediate turning position, in which the hub is rotatable in both directions, and by continued turning of the actuating ring in said other direction is turnable to its second turning position, in which the hub is rotatable in said one direction but is prevented from rotating in said other direction and in which the lock body holder by the abutment of the lock bodies against the associated second wedge surfaces is prevented from being turned further in said other direction, the second locking ring means, in further continued turning of the actuating ring in said other direction, being turnable, against the action of the second spring, in said other direction relative to the lock body holder to said first mutual turning position, in which the hub is also prevented from rotating in said one direction and thus is completely locked.

The actuating ring may have a radially projecting actuating arm for turning of the actuating ring, in which case the actuating arm can be connected to a wire.

The lock bodies preferably consist of rolls, whose axes are parallel with said axis.

The mounting part may be adapted to be mounted on a wheelchair frame, in which case the hub has means for non-turnable connection of the hub and a wheelchair wheel.

BRIEF DESCRIPTION OF THE DRAWINGS

The invention will now be described in more detail by means of an embodiment and with reference to the accompanying drawings.

FIGS. 6–9 illustrate the position of the roll holder in relation to the first and the second locking ring in four different setting positions of the freewheel hub device.

DESCRIPTION OF A PREFERRED EMBODIMENT

Figure 1:
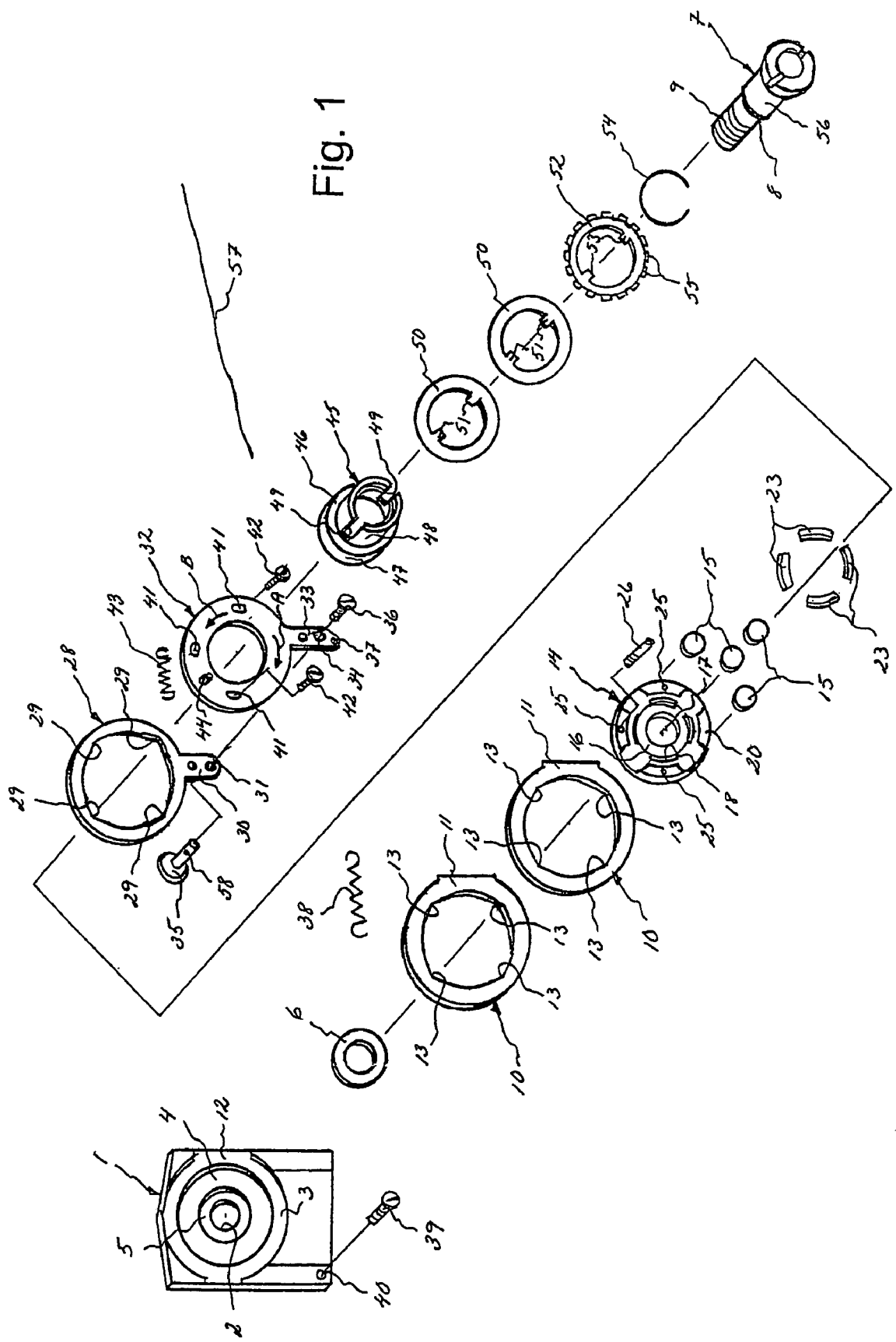
FIG. 1 is an exploded view and shows a freewheel hub device according to the present invention.

The freewheel hub device shown in the drawings has a mounting part 1 in the form of an essentially rectangular aluminium plate with a through hole 2. The mounting part 1 has three circular recesses 3–5 concentric with the hole 2 and arranged in steps, viz. an outer recess 3, an intermediate recess 4 formed therein and an inner recess 5 located adjacent to the hole 2 and formed in the intermediate recess 4. A brass washer 6 is placed in the inner recess 5. The thickness of the washer 6 approximately equals the depth of the inner recess 5. A sleeve-shaped bearing bolt 7 for holding, for instance, a wheel axle journal extends through the hole 2 and abuts against the washer 6 by means of a circumferential shoulder 8. A nut (not shown) is screwed onto the threaded portion 9 of the bolt 7 and clamps the bolt 7 against the washer 6, which prevents the bolt from rotating.

Figure 4:
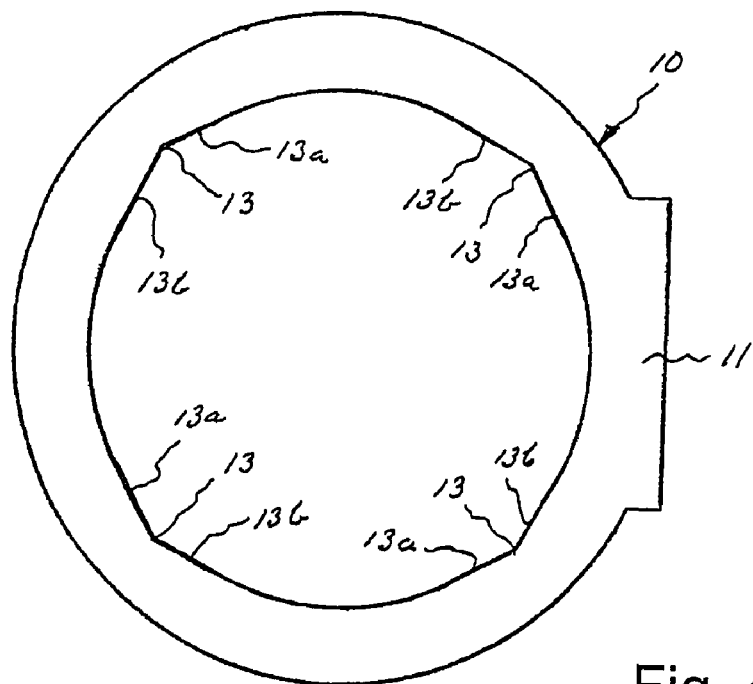
FIG. 4 shows a first locking ring included in the freewheel hub device according to FIG. 1.

Two identical locking rings 10, which are made of hard sheet steel by punching, together form a first locking ring means. The locking rings 10 have a combined thickness which equals the depth of the outer recess 3, and an outer diameter which equals the diameter of the outer recess 3, and are arranged in the outer recess 3. Each locking ring 10 has a laterally extending protrusion 11, which is fitted into a correspondingly formed expansion 12 of the outer recess 3 and is thus held non-turnably in the mounting part 1. Each locking ring 10 has an inner diameter which is somewhat greater than the diameter of the intermediate recess 4. Each locking ring 10 further has four axial grooves 13 which are uniformly distributed along the inner circumference and are V-shaped in cross-section with a V angle of about 140° (see FIG. 4). One side wall of each groove 13 forms a first wedge surface 13a and its other side wall forms a second wedge surface 13b.

Figure 2:
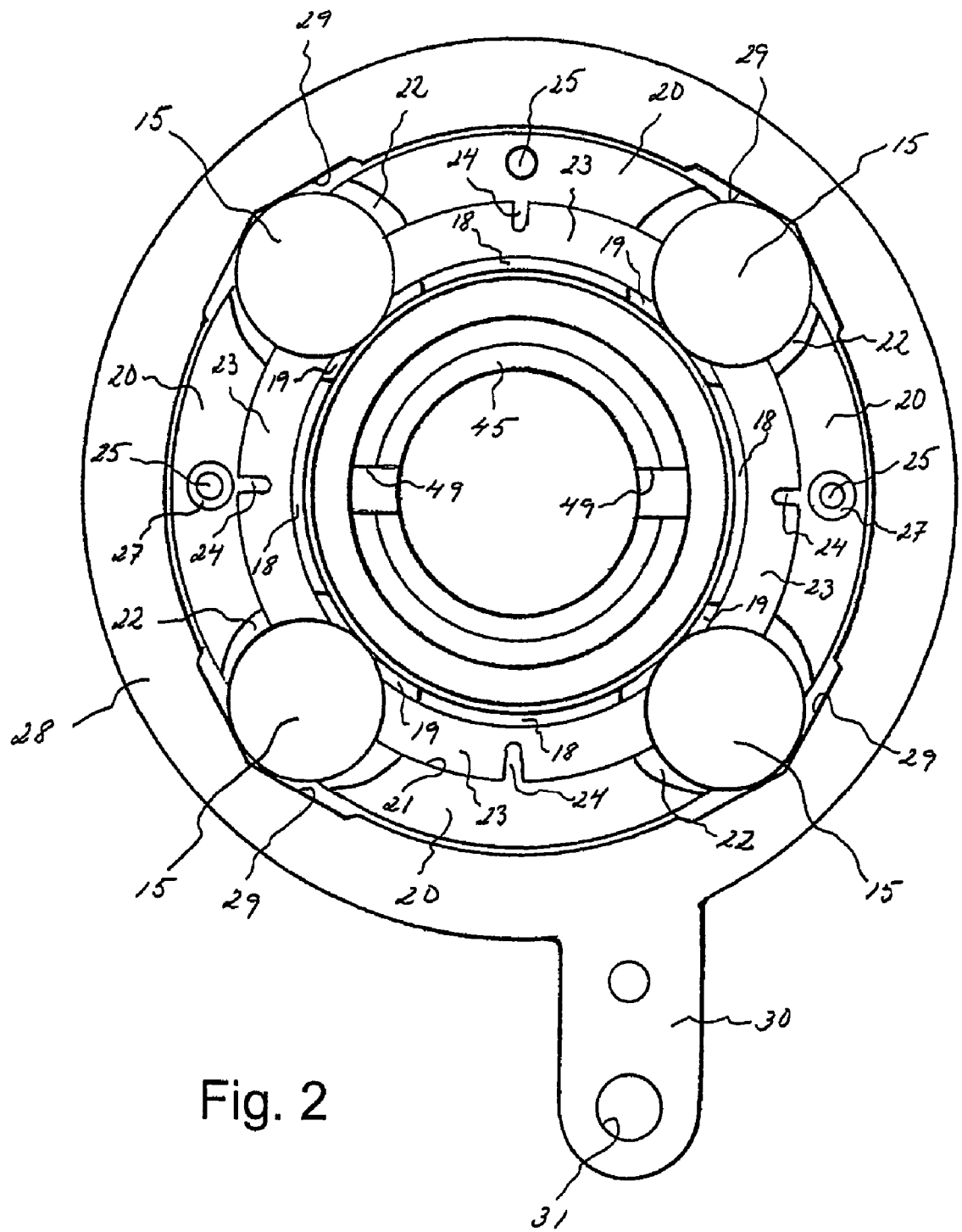
FIG. 2 shows a roll holder included in the freewheel hub device according to FIG. 1, with a hub inserted.
Figure 3:
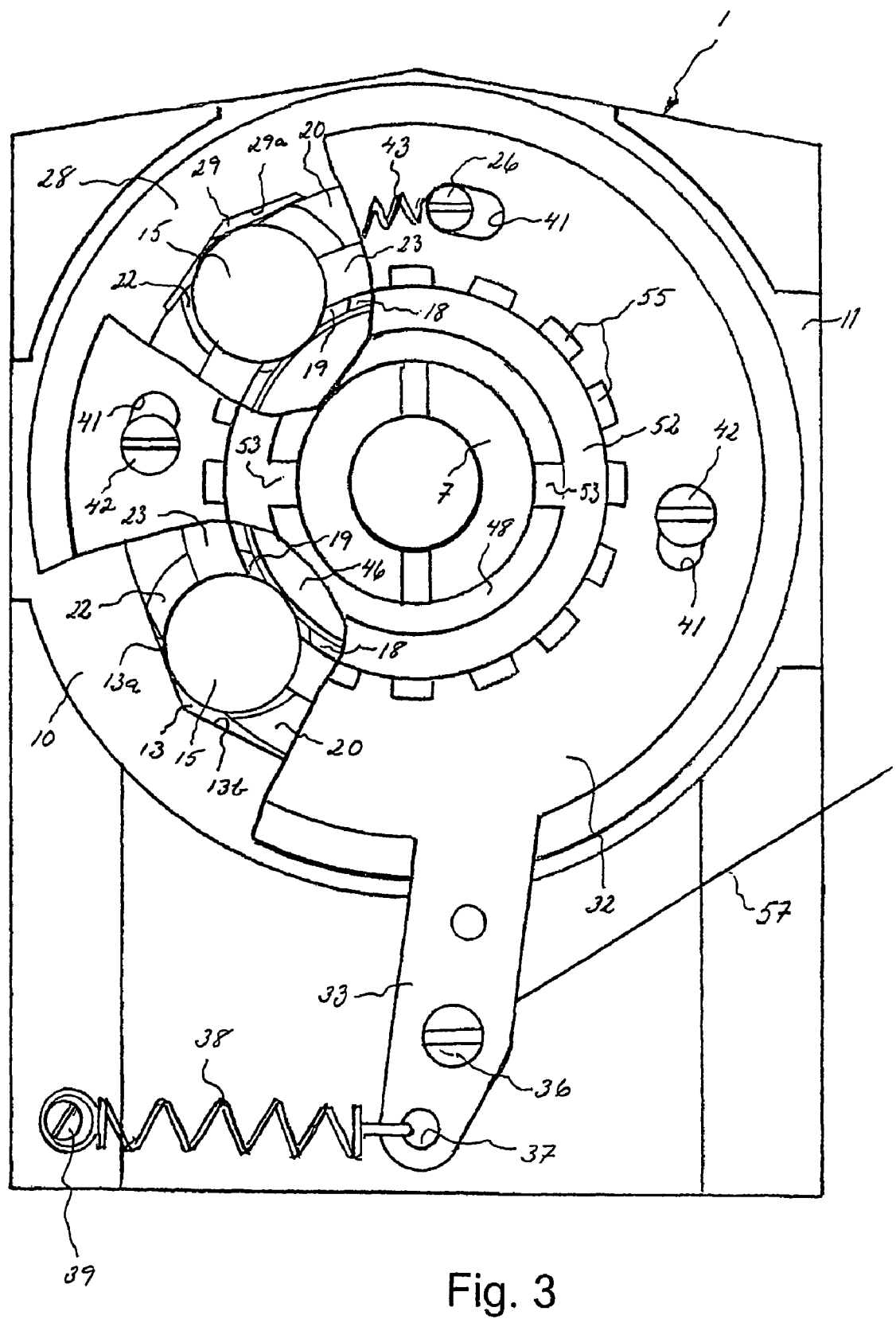
FIG. 3 shows the freewheel hub device according to FIG. 1 in an assembled state and with some parts broken away.

An essentially circular-cylindrical roll holder 14, which is shown in more detail in FIG. 2, supports four lock bodies in the form of rolls 15. The outer diameter of the roll holder 14 is somewhat smaller than the inner diameter of the locking rings 10. The roll holder 14 has at its side facing the mounting part 1 a bottom plate 16 with a centre bore 17. The roll holder 14 also has an inner rim 18 which surrounds the centre bore 17 and whose inner diameter is greater than the diameter of the centre bore. The inner rim 18 is divided into four sections which are uniformly distributed in the circumferential direction and between them form openings 19 whose extent in the circumferential direction at the inside of the rim sections is smaller than the diameter of the rolls 15. The roll holder 14 also has an outer rim 20 which defines the roll holder 14 outwards and which together with the inner rim 18 defines an annular groove 21 in the roll holder 14. The outer rim 20 is, like the inner rim 18, divided into four sections which are uniformly distributed in the circumferential direction and between them form openings 22 which are positioned opposite to the openings 19 in the inner rim 18. The extent of the openings 22 in the circumferential direction at the outside of the outer rim sections is smaller than the diameter of the rolls 15. The rolls 15 are each placed in one of the compartments which are formed by the openings 19 and 22 in the rims 18 and 20. The rolls 15 are arranged in these compartments in such a manner that their axes are parallel with the axis of the centre bores 2 and 17.

Four circular-arc-shaped spring elements 23 of elastic material, such as polyurethane, are arranged in the annular groove 21 and each abut at their ends against two rolls 15. The spring elements 23 are kept in place by means of protrusions 24 which extend radially inwards from the outer rim 20 and which engage in a corresponding recess in the respective spring elements 23. The spring elements 23 force the rolls 15 radially outwards.

An axially directed threaded hole 25 is formed in three of the four sections of the outer rim 20. A pin 26 is screwed into one of these holes 25. A spacer sleeve 27 is arranged round each of the two other holes 25.

Figure 5:
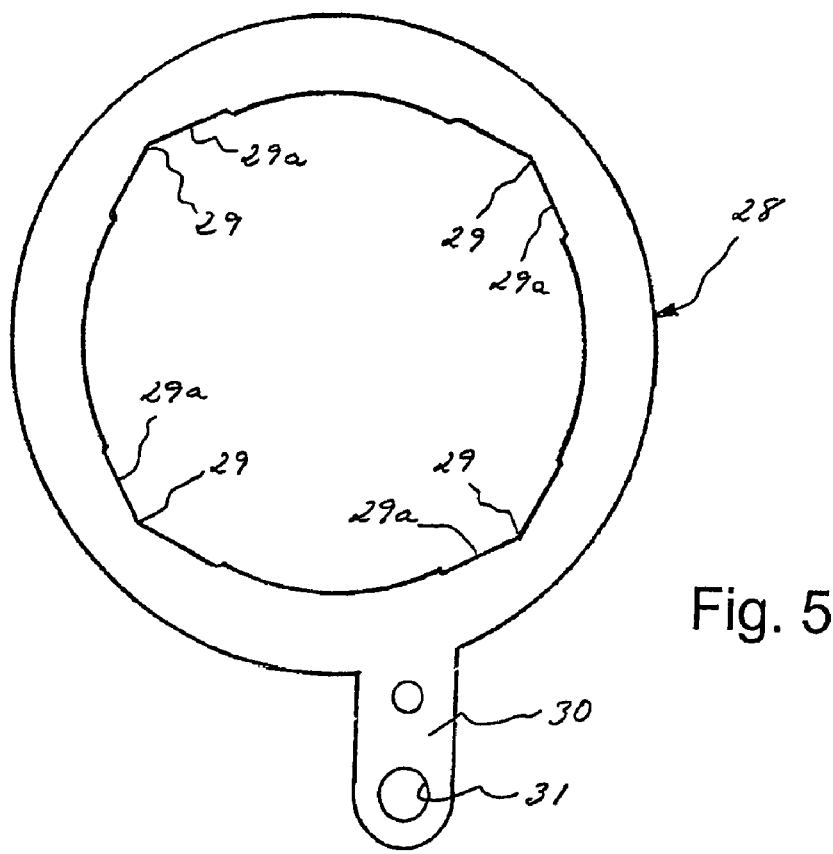
FIG. 5 shows a second locking ring included in the freewheel hub device according to FIG. 1.

A locking ring 28, which is made of hard steel sheet by punching, forms a second locking ring means. The locking ring 28 has an inner diameter which is the same as the inner diameter of the locking rings 10, i.e. equal to the outer diameter of the roll holder 14, and an outer diameter which is slightly smaller than the outer diameter of the locking ring 10. The locking ring 28 has four axial grooves 29, which are uniformly distributed along the inner circumference and which are V shaped in cross-section with a V angle of about 140° (see FIG. 5). One side wall of each groove 29 forms a third wedge surface 29a. The locking ring 28 has a radially projecting arm 30 with a through hole 31.

The locking ring 28 abuts against one of the locking rings 10 and surrounds, like these, the roll holder 14. The locking rings 10 and 28 and the roll holder 14 are arranged in such a mutual turning position that the rolls 15 are located essentially opposite to the grooves 13 and 29. The rolls 15 extend a distance into the grooves 13 and 29 by being forced radially outwards by the spring elements 23.

The shown freewheel hub device further has an actuating ring 32, which has a somewhat smaller outer diameter than the second locking ring 28, and an inner diameter which is equal to the outer diameter of the inner rim 18 of the roll holder 14. The actuating ring 32 is turnably arranged on the inner rim 18. The actuating ring 32 has a radially projecting actuating arm 33 with a through hole 34. An internally threaded, sleeve-shaped pin 35 extends through the hole 31 in the arm 30 of the second locking ring 28 and through the hole 34 in the arm 33 of the actuating ring 32, and a screw 36 is screwed into the sleeve-shaped pin 35. The actuating ring 32 and the second locking ring 28 are thus non-turnably connected to each other.

The actuating arm 32 has a further through hole 37, in which one end of a tension spring 38 is fixed. The other end of the tension spring 38 is fixed to a screw 39 which is screwed into a hole 40 in the vicinity of one of the corners of the mounting part 1. The tension spring 38 biases the actuating ring 32 and, thus, the second locking ring 28 in one turning direction A (clockwise with regard to FIG. 1).

The actuating ring 32 has three through holes 41 each located essentially opposite to one of the three threaded holes 25 in the outer rim 20 of the roll holder 14. The holes 41 are elongate in the circumferential direction. The pin 26 fixed to the outer rim 20 of the roll holder 14 extends through one of the holes 41. Two screws 42 each extend through one of the two other holes 41 and are screwed into corresponding holes 25 in the outer rim 20 of the roll holder 14. One end of a tension spring 43 is fixed to the pin 26 and the other end is fixed to a pin 44 which is fixed to the actuating ring 32 and which is arranged relative to the pin 26 in such a manner that the tension spring 43 strives to turn the roll holder 14 relative to the actuating ring 32 in the turning direction B opposite to said one turning direction A. As a result, the pin 26 and the two screws 42 abut against one terminal edge of the respective holes 41.

A sleeve-shaped hub 45 has a first hub portion 46 whose outer circumference is essentially equal to the inner diameter of the inner rim 18 and by means of which the hub 45 is rotatably mounted in the roll holder 14. The circular-cylindrical circumferential surface 47 of the first hub portion 46 cooperates with the rolls 15 in the roll holder 14. The hub 45 also has a second hub portion 48 which has a smaller outer diameter than the first hub portion 46 and which is divided into two halves by means of two diametrically opposed axial slots 49.

Two spring washers 50, which each have two diametrically opposed projections 51 extending radially inwards are slipped onto the second hub portion 48 and rest against the first hub portion 46. The projections 51 each engage in a slot 49 so that the spring washers 50 are non-turnably connected to the hub 45.

A coupling ring 52, which has two diametrically opposed projections 53 extending radially inwards, is in the same way as the spring washers 50 non-turnably arranged on the second hub portion 48. The spring washers 50 and the coupling ring 52 are held on the hub 45 by means of a retaining ring 54 which engages in a circumferential groove (not shown) formed in the second hub portion 48. The spring washers 50 press the coupling ring 52 into engagement with the retaining ring 54. The coupling ring 52 has the form of a toothed wheel with teeth 55 directed axially away from the first hub portion 46.

The hub 45 is rotationally mounted on that portion 56 of the sleeve-shaped bearing bolt 7 which defines the bearing bolt shoulder 8 abutting against the brass washer 6. The roll holder 14 is also mounted on this portion 56.

The coupling ring 52 is arranged to be non-turnably connected to a corresponding coupling ring (not shown) which is non-turnably connected to a wheel whose journal is mounted in the bearing bolt 7.

The shown freewheel hub device further has an operating cable or wire 57 which is attached in a transverse hole 58 in the sleeve-shaped pin 35.

FIGS. 6-9 illustrate the position of the roll holder 14 and, thus, of the rolls in relation to on the one hand the locking rings 10 (in the upper part in each Figure) and, on the other hand, the locking ring 28 (in the lower part in each Figure) in four different setting positions of the freewheel hub device described above.

FIG. 6 shows the starting position of the freewheel hub device, in which the roll holder 14 is held by the spring 38 in a first turning position relative to the mounting part 1 and is held by the spring 43 in a second mutual turning position relative to the locking ring 28. In the first turning position of the roll holder 14 the rolls 15 abut against the respective first wedge surfaces 13a of the first locking rings 10. The wedge surfaces 13a force, against the action of the spring elements 23, the rolls 15 radially inwards in the roll holder 14 into engagement with the circumferential surface 47 of the hub 45, whereby the hub is prevented from rotating in said one direction A. At the same time the roll holder 14 is, as mentioned above, in its second mutual turning position relative to the locking ring 28, in which the rolls 15 are positioned in the respective grooves 29 in the locking ring 28 without abutting against any one of the side walls of the groove. In the starting position of the freewheel hub device, the hub 45 can thus rotate in said direction B but is prevented from rotating in said direction A.

When the actuating ring 32 is turned by means of the wire 57 in said direction B against the action of the spring 38, also the locking ring 28 which is non-turnably connected to the actuating ring 32 and the roll holder 14 connected to the actuating ring 32 by means of the spring 43 are turned in this direction. The roll holder 14 then first reaches an intermediate turning position relative to the mounting part 1, which is shown in FIG. 7 and in which the rolls 15 are positioned in the respective grooves 13 in the locking rings 10 without abutting against any one of the side walls of the groove. At the same time the roll holder 14 is still located in its second mutual turning position relative to the locking ring 28. The rolls 15 are held by the spring elements 53 disengaged from the circumferential surface 47 of the hub 45, so that the hub can rotate in both directions A and B.

In continued turning of the actuating ring 32 in said direction B, the roll holder 14 reaches a second turning position relative to the mounting part 1, which is shown in FIG. 8 and in which the rolls 15 abut against the respective second wedge surfaces 13b of the locking rings 10. The wedge surfaces 13b force, against the action of the spring elements 23, the rolls 15 radially inwards into engagement with the circumferential surface 47 of the hub 45, whereby the hub is prevented from rotating in said direction B. At the same time the roll holder 14 is still located in its second mutual turning position relative to the locking ring 28. Thus the hub 45 can rotate in said direction A but is prevented from rotating in said second direction B.

In still continued turning of the actuating ring 32 in said direction B, the roll holder 14 is no more carried along since it is stopped owing to the abutment of the rolls 15 against the respective second wedge surfaces 13b of the locking rings 10. The roll holder 14 is thus secured, which means that the actuating ring 32 and, thus, the locking ring 28 turn, against the action of the spring 43, in said second direction B relative to the roll holder 14, which is allowed by the holes 41 in the actuating ring being elongate. The roll holder 14 will take a first mutual turning position relative to the locking ring 28, in which the rolls 15 abut against the respective third wedge surfaces 29a of the locking ring 28. The wedge surfaces 29a force, against the action of the spring elements 23, the rolls 15 radially inwards in the roll holder 14 into engagement with the circumferential surface 47 of the hub 45, whereby the hub 45 is also prevented from rotating in said direction A and consequently, is completely locked.

Figure 10:
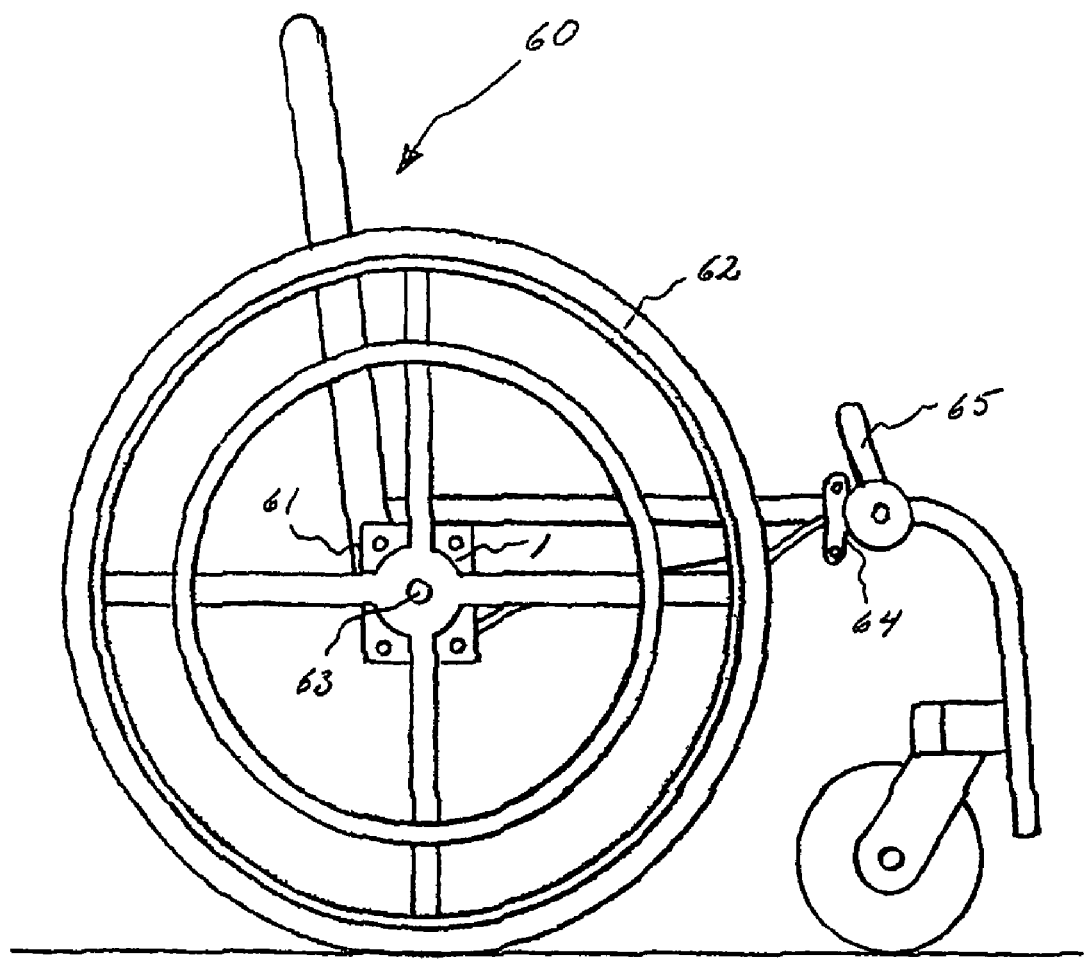
FIG. 10 shows a wheelchair provided with a freewheel hub device according to the invention.

The above described freewheel hub device is shown in FIG. 10 mounted on the right side of the frame 61 of a wheelchair 60. A corresponding freewheel hub device is conveniently also mounted in the same way on the left side of the wheel-chair 60. The wheels 62 of the wheel-chair 60 have a journal 63 which is mounted in the bearing bolt 7 of the freewheel hub device. A coupling ring (not shown) which corresponds to the coupling ring 52 and which is non-turnably connected to the wheel 62 is non-turnably connected to the coupling ring 52 and, hence, to the hub 45. The operating wire 57 of the freewheel hub device is at its free end fixed to a setting mechanism 64, which has a setting lever 65 pivoting on a transverse shaft. The lever 65 is in FIG. 10 shown in its rear position, which corresponds to the starting position of the freewheel hub device. In the position of the lever 65 shown in FIG. 10, the wheel 62 of the wheelchair 60 is thus freely rotatable in said second direction B (counterclockwise in FIG. 10), i.e. backwards, but cannot rotate in the opposite direction, i.e. forwards. When pivoting the lever 65 one step forward, a position is obtained, in which the wheel 62 is freely rotatable in both directions. When pivoting the lever 65 one more step forwards, a position is obtained, in which the wheel 62 is freely rotatable in said direction A (clockwise in FIG. 10), i.e. forwards, but cannot rotate in the opposite direction, i.e. backwards. When pivoting the lever 65 one more step forwards, a position is obtained, in which the wheel 62 is completely locked and cannot rotate in any direction.

The invention claimed is:

1. A freewheel hub device, comprising a mounting part (1); a first locking ring means (10), which is supported by and non-turnably connected to the mounting part and has a centre bore and axial inner grooves (13) , whose one side wall forms a first wedge surface (13a) which has a distance, decreasing in one circumferential direction (A) of the first locking ring means, to the axis of the centre bore ; a lock body holder (14), which is mounted, in a limited turnable manner, in the centre bore of the first locking ring means (10) and supports at least two lock bodies (15) which project radially a distance from the lock body holder and each extend in a separate groove (13) of the first locking ring means (10) and which are movable radially inwards against spring action directed essentially radially outwards; and a hub (45), which is rotationally mounted in the lock body holder (14) coaxially therewith and has a circular-cylindrical circumferential surface (47) for cooperation with the lock bodies (15), each lock body (15), after turning of the lock body holder (14) in said one direction (A) to a first turning position, abutting against the associated first wedge surface (13a), which against said spring action forces the lock body radially inwards in the lock body holder into engagement with the circumferential surface (47) of the hub (45), whereby the hub is prevented from rotating in said one direction (A), characterised in that the other side wall of the axial grooves (13) formed in the first locking ring means (10) forms a second wedge surface (13b), which has a distance, decreasing in the other circumferential direction (B) of the first locking ring means, to the axis of the centre bore, each lock body (15), after turning of the lock body holder (14) in said other direction (B) to a second turning position, abutting against the associated second wedge surface (13b), which against said spring action forces the lock body radially inwards in the lock body holder into engagement with the circumferential surface (47) of the hub (45), whereby the hub is prevented from rotating in said other direction (B), while each lock body (15), when the lock body holder (14) is in an intermediate turning position between the first and the second turning position, is held, by said spring action, disengaged from the circumferential surface (47) of the hub (45), so that the hub is rotatable in both directions (A and B), that the device further comprises a second locking ring means (28) which is concentric with the first locking ring means (10) and has a centre bore and axial inner grooves (29), whose one side wall forms a third wedge surface (29a) which has a distance to said axis, which decreases in said one direction (A), the lock body holder (14) being mounted in a limited turnable manner in the centre bore of the second locking ring means (28) in such a manner that said lock bodies (15) each extend into a separate groove (29) of the second locking ring means, each lock body (15), when the lock body holder (14) and the second locking ring means (28) are in a first mutual turning position after turning of the second locking ring means in said other direction (B) relative to the lock body holder, abutting against the associated third wedge surface (29a), which against said spring action forces the lock body radially inwards in the lock body holder into engagement with the circumferential surface (47) of the hub (45), whereby the hub is prevented from rotating in said one direction (A).

2. A freewheel hub device as claimed in claim 1, in which a first spring (38) is arranged to bias the lock body holder (14) in said one direction (A) in such a manner that it takes its first turning position, in which each lock body (15) abuts against the associated first wedge surface (13a).

3. A freewheel hub device as claimed in claim 1, in which the lock body holder (14) and the second locking ring means (28) are biased relative to one another by means of a second spring (43) in such a manner that they take a second mutual turning position, from which the second locking ring means is, against the action of the second spring, turnable in said other direction (B) relative to the lock body holder to said first mutual turning position.

4. A freewheel hub device as claimed in claim 1, which has an actuating ring (32), which is concentric with said first and second locking ring means (10,28) and the lock body holder (14) and is non-turnably connected to the second locking ring means (28) and connected to the lock body holder in a limited turnable manner, wherein, when the device is in a starting position, in which the lock body holder (14) is held by the first spring (38) in its first turning position and the lock body holder (14) and the second locking ring means (28) are held by the second spring (43) in their second mutual turning position and the hub (45) thus is rotatable in said other direction (B) but is prevented from rotating in said one direction (A), the lock body holder (14), by turning of the actuating ring (32) in said other direction (B), is turnable to its intermediate turning position, in which the hub (45) is rotatable in both directions (A and B), and by continued turning of the actuating ring (32) in said other direction (B) is turnable to its second turning position, in which the hub (45) is rotatable in said one direction (A) but is prevented from rotating in said other direction (B) and in which the lock body holder (14) by the abutment of the lock bodies (15) against the associated second wedge surfaces (13b) is prevented from being turned further in said other direction (B), the second locking ring means (28), in further continued turning of the actuating ring (32) in said other direction (B), being turnable, against the action of the second spring (43), in said other direction (B) relative to the lock body holder (14) to said first mutual turning position, in which the hub (45) is also prevented from rotating in said one direction (A) and thus is completely locked.

5. A freewheel hub device as claimed in claim 4, in which the actuating ring (32) has a radially projecting actuating arm (33) for turning of the actuating ring.

6. A freewheel hub device as claimed in claim 5, in which the actuating arm (33) is connected to a wire (56).

7. A freewheel hub device as claimed in claim 1, in which the lock bodies (15) consist of rolls whose axes are parallel with said axis.

8. A freewheel hub device as claimed in claim 1, in which the mounting part (1) is adapted to be mounted on a wheelchair frame (61) and the hub (45) has means (52) for non-turnable connection of the hub and a wheelchair wheel (62).

* * * * *